United States Patent
Shinohara et al.

(10) Patent No.: US 6,773,525 B2
(45) Date of Patent: Aug. 10, 2004

(54) PLATE SHAPED MATTER ADHERING APPARATUS AND METHOD

(75) Inventors: Shinichi Shinohara, Tokyo (JP); Hideo Kobayashi, Tokyo (JP); Masahiro Nakamura, Saitama (JP); Kanya Kaji, Tokyo (JP)

(73) Assignee: Origin Electric Company, Limited, Tokyo (JP)

( * ) Notice: Subject to any disclaimer, the term of this patent is extended or adjusted under 35 U.S.C. 154(b) by 9 days.

(21) Appl. No.: 10/239,564

(22) PCT Filed: Feb. 8, 2002

(86) PCT No.: PCT/JP02/01080

§ 371 (c)(1),
(2), (4) Date: Sep. 24, 2002

(87) PCT Pub. No.: WO02/068554

PCT Pub. Date: Sep. 6, 2002

(65) Prior Publication Data

US 2003/0075267 A1 Apr. 24, 2003

(30) Foreign Application Priority Data

Feb. 26, 2001 (JP) ........................................ 2001-049513

(51) Int. Cl.[7] .............................................. B32B 31/20
(52) U.S. Cl. ................... 156/64; 156/274.8; 156/275.5; 156/299; 156/358; 156/367; 156/368; 156/380.6
(58) Field of Search ......................... 156/64, 358, 360, 156/367, 368, 378, 379, 228, 295, 297, 299, 274.4, 274.8, 275.5, 379.2, 380.2, 380.3, 380.4, 380.6, 556, 580

(56) References Cited

U.S. PATENT DOCUMENTS 5,080,736 A * 1/1992 Matsui ........................ 156/64

FOREIGN PATENT DOCUMENTS

EP    1 026 214 A2    8/2000
JP    10-312591       11/1998

* cited by examiner

Primary Examiner—Richard Crispino
Assistant Examiner—George R. Koch, III
(74) Attorney, Agent, or Firm—McDermott Will & Emery LLP

(57) ABSTRACT

Adhering apparatus for plate shaped matter includes absorbing-and-holding means 10, 20 serving also as electrodes for absorbing and holding respectively first optical disc substrate 1 and second optical disc substrate 2, optical disc substrate moving means 40 for moving second optical disc substrate 2 to be approached to first optical disc substrate, distance detecting means 50 for detecting the distance between optical disc substrates, velocity controlling means 60 for controlling a relative velocity of the second plate shaped matter to the first plate shaped matter and controlling the plate shaped matter moving means in such a manner that the relative velocity immediately after and at a time point at which the adhesive applied onto the first plate shaped matter is brought in contact with the second plate shaped matter is slower than that immediately before the adhesive applied onto the first plate shaped matter is brought in contact with the second plate shaped matter; and voltage application means 71 for applying voltage between the first plate shaped matter and the second plate shaped matter before the adhesive applied onto the first plate shaped matter is brought in contact with the second plate shaped matter.

13 Claims, 4 Drawing Sheets

100 :

PLATE SHAPED MATTER ADHERING APPARATUS AND METHOD

TECHNICAL FIELD

The present invention relates to apparatus and method for adhering two sheets of plate shaped matters such as optical disc substrates.

BACKGROUND ART

As is well known, for example, the following processes are adopted as a conventional method for mutually adhering two sheets of optical disc substrates with an adhesive.

First, the adhesive is circularly supplied onto an adhering surface of one of the two sheets of optical disc substrates, the one of the two sheets of the optical disc substrates is carried onto a lower disc absorption mechanism of an overlapping mechanism, is absorbed and held thereat, and with an adhering surface of the other of the two sheets of optical disc substrates faced downward, the other of the two sheets of the optical disc substrates is carried onto upper disc absorption mechanism in the overlapping mechanism, and adsorbed and held thereat.

Thereafter, a voltage is applied between the one optical disc substrate and the other optical disc substrate to make the one optical disc substrate and the other optical disc substrate approach to each other and the two optical disc substrates are overlapped with each other. When a distance between the two optical disc substrates reaches to a set inter-substrate distance, the voltage application is stopped so that the lower disc absorption mechanism and the upper disc absorption mechanism are released from the absorption and holding.

Then, the two sheets of mutually overlapped optical disc substrates are carried to a spinner. Then, the spinner is rotated at a high speed and the adhesive is widened to a predetermined region. An ultraviolet ray is, then, radiated on the optical disc substrate so as to cure an adhesive layer.

When the two sheets of optical disc substrates are mutually overlapped with each other via the adhesive, the two optical disc substrates are mutually approached to each other. As a distance between two optical disc substrates becomes shorter, an influence of voltage application becomes so large that a summit portion of the adhesive is tapered and a contact area between the adhesive and the other optical disc substrate becomes very small at an instantaneous time when the adhesive is brought in contact with the other disc substrate. This can mutually overlap the two optical disc substrates without development in air bubbles thereon.

In the above-described conventional art, in order to shorten a required time of adhering step, a velocity of approaching two sheets of optical disc substrates 1 and 2 maybe quickened. As the velocity is increased, the summit portion of adhesive 5 cannot sufficiently be tapered. The contact area between adhesive 5 and the other optical disc substrate becomes large. Consequently, air bubbles tend to be easy to be generated.

In this case, the increase in the voltage value to be applied causes the electric field to be increased. Hence, the summit portion of the adhesive can be tapered. However, if the two sheets of optical disc substrates mutually approach to each other, a discharge phenomenon occurs between the two sheets of optical disc substrates. This discharge phenomenon causes a partial breakage of a metal reflective film formed on a recording sheet, causes several pits to be damaged, and a reliability of data recording is reduced.

In addition, after the adhesive is applied over a whole periphery with a predetermined radius of the one optical disc substrate, it is necessary to mutually approach the two sheets of optical disc substrates, to widen a liquid film of the adhesive between an inner peripheral direction and an outer peripheral direction, and to stabilize a liquid film to a degree such that no problem occurs when the two sheets of optical disc substrates are carried. However, a continuous application of voltage causes the adhesive to be deteriorated and a reliability is reduced. The above-described problems could occur in such a plate shaped matter as a glass plate, a lens, or the like other than the optical disc substrates.

DISCLOSURE OF THE INVENTION

It is an object of the present invention to provide plate shaped matter adhering apparatus and plate shaped matter adhering method which can shorten a whole time duration for which the two sheets of optical disc substrates are adhered together when two sheets of plate shaped matters are mutually approached to each other without development of air bubbles and in which an adhesive is not deteriorated without occurrence in discharge between two sheets of optical disc substrates.

To achieve the above-described object, according to the present invention, a relative velocity between first and second plate shaped matters at a time point immediately after the adhesive applied onto the second plate shaped matter is brought in contact with the first plate shaped matter is lower than the relative velocity at a time point immediately before the adhesive applied onto the second plate shaped matter is brought in contact with the first plate shaped matter and a voltage is applied between the first plate matter and the second plate shaped matter at a time point before the adhesive applied onto the second plate shaped matter is brought in contact with the first plate shaped matter and an alternating current voltage is applied between the first plate shaped matter.

That is to say, according to the present invention defined in a first embodiment of the invention, there is provided a plate shaped matter adhering apparatus which adheres between a first plate shaped matter and a second plate shaped matter together via an adhesive and cures the adhesive, the plate shaped matter adhering apparatus comprising: plate shaped matter moving means for moving the first plate shaped matter and the second plate shaped matter to approach to each other with the adhesive applied onto the second plate shaped matter while the first plate shaped matter is faced against the second plate shaped matter; velocity controlling means for controlling a relative velocity of one of the first and second plate shared matters to the other of the first and second plate shared matters and controlling the plate shaped matter moving means in such a manner that the relative velocity immediately after and at a time point at which the adhesive applied onto the second plate shaped matter is brought in contact with the first plate shaped matter is slower than that immediately before the adhesive applied onto the second plate shaped matter is brought in contact with the first plate shaped matter; and voltage applying means for applying voltage between the first plate shaped matter and the second plate shaped matter before the adhesive applied onto the second plate shaped matter is brought in contact with the first plate shaped matter.

According to the invention defined in a second embodiment of the invention, there is provided a plate shaped matter adhering apparatus as defined in the first embodiment, wherein the adhering apparatus further comprises distance detecting means for detecting a distance between the first plate shaped matter and the second plate shaped matter and estimates a time point immediately before the adhesive applied onto the second plate shaped matter is brought in contact with the first plate shaped matter on the basis of the distance detected by the distance measuring means.

According to the invention defined in a third embodiment of the invention, there is provided a plate shaped matter adhering apparatus as defined in the second embodiment, wherein the distance between the first plate shaped matter and the second plate shaped matter at the time point immediately before the adhesive applied onto the second plate shaped matter is brought in contact with the first plate shaped matter is equal to or shorter than 5 mm and, preferably, is equal to or shorter than 2 mm.

According to the invention defined in a fourth embodiment of the invention, there is provided a plate shaped matter adhering apparatus as defined in the first embodiment, wherein the adhering apparatus further comprises time elapsed detecting means for detecting a time elapsed from a predetermined timing and estimates a time point immediately before the adhesive applied onto the second plate shaped matter is brought in contact with the first plate shaped matter on the basis of the time detected by the time elapsed detecting means.

According to the invention defined in a fifth embodiment of the invention, there is provided a plate shaped matter adhering apparatus for a plate shaped matter as defined in the first embodiment, wherein the relative velocity at a time point immediately before the adhesive applied onto the second plate shaped matter is brought in contact with the first plate shaped matter is equal to or higher than 25 mm/second and, preferably, is equal to or higher than 50 mm/second.

According to the invention defined in a sixth embodiment of the invention, there is provided a plate shaped matter adhering apparatus as defined in the first embodiment, wherein the relative velocity at a time point immediately after the adhesive applied onto the second plate shaped matter is brought in contact with the first plate shaped matter is equal to or lower than 10 mm/second and, preferably, is equal to or higher than 5 mm/second.

According to the invention defined in a seventh embodiment of the invention, there is provided a plate shaped matter adhering apparatus which adheres between a first plate shaped matter and a second plate shaped matter together via an adhesive and cures the adhesive, the plate shaped matter adhering apparatus comprising: plate shaped matter moving means for moving the first plate shaped matter and the second plate shaped matter to approach to each other with the adhesive applied onto the first plate shaped matter and onto the second plate shaped matter while the first plate shaped matter is faced against the second plate shaped matter; velocity controlling means for controlling a relative velocity of one of the first and second plate shaped matters to the other of the first and second plate shaped matters and controlling the plate shaped matter moving means in such a manner that the relative velocity immediately after and at a time point at which the adhesive applied onto the first plate shaped matter is brought in contact with the adhesive applied onto the second plate shaped matter is slower than that immediately before the adhesive applied onto the first plate shaped matter is brought in contact with the adhesive applied onto the second plate shaped matter; and voltage applying means for applying voltage between the first plate shaped matter and the second plate shaped matter before the adhesive applied onto the first plate shaped matter is brought in contact with the adhesive applied onto the second plate shaped matter.

According to the invention defined in an eighth embodiment of the invention, there is provided a plate shaped matter adhering apparatus as claimed in any one of the preceding first through seventh embodiments, wherein the voltage application means is turned off after the adhesive is brought in contact with the other adhesive.

According to the invention defined in a ninth embodiment of the invention, there is provided a plate shaped matter adhering method in which a first plate shaped matter and a second plate shaped matter are adhered together via an adhesive and the adhesive is cured, the plate shaped matter adhering method comprising: plate shaped matter moving step for moving the first plate shaped matter and the second plate shaped matter to approach to each other with the adhesive applied onto the second plate shaped matter while the first plate shaped matter is faced against the second plate shaped matter; velocity controlling step for controlling a relative velocity of one of the first and second plate shaped matters to the other of the first and second plate shaped matters in such a manner that the relative velocity immediately after and at a time point at which the adhesive applied onto the second plate shaped matter is brought in contact with the first plate shaped matter is slower than that immediately before the adhesive applied onto the second plate shaped matter is brought in contact with the first plate shaped matter; and voltage applying step for applying voltage between the first plate shaped matter and the second plate shaped matter before the adhesive applied onto the second plate shaped matter is brought in contact with the first plate shaped matter.

According to the invention defined in a tenth embodiment of the invention, there is provided a plate shaped matter adhering method in which a first plate shaped matter and a second plate shaped matter are adhered together via an adhesive and the adhesive is cured, the plate shaped matter adhering method comprising: plate shaped matter moving step for moving the first plate shaped matter and the second plate shaped matter to approach to each other with the adhesive applied onto the first plate shaped matter and onto the second plate shaped matter while the first plate shaped matter is faced against the second plate shaped matter; velocity controlling step for controlling a relative velocity of one of the first and second plate shaped matters to the other of the first and second plate shaped matters and controlling the plate shaped matter moving means in such a manner that the relative velocity immediately after and at a time point at which the adhesive applied onto the first plate shaped matter is brought in contact with the adhesive applied onto second plate shaped matter is slower than that immediately before the adhesive applied onto the first plate shaped matter is brought in contact with the adhesive applied onto the second plate shaped matter; and voltage applying step for applying voltage between the first plate shaped matter and the second plate shaped matter immediately before the adhesive applied onto the first plate shaped matter is brought in contact with the adhesive applied onto the second plate shaped matter.

According to the invention defined in an eleventh embodiment of the invention there is provided a plate shaped matter adhering method as defined in the ninth embodiment, wherein, when the one adhesive is brought in contact with the other plate shaped matter, the application of the voltage is stopped.

BEST MODE FOR CARRYING OUT THE INVENTION

Reference will hereinafter be made to the drawings in order to facilitate a better understanding of the present invention.

Figure 1:
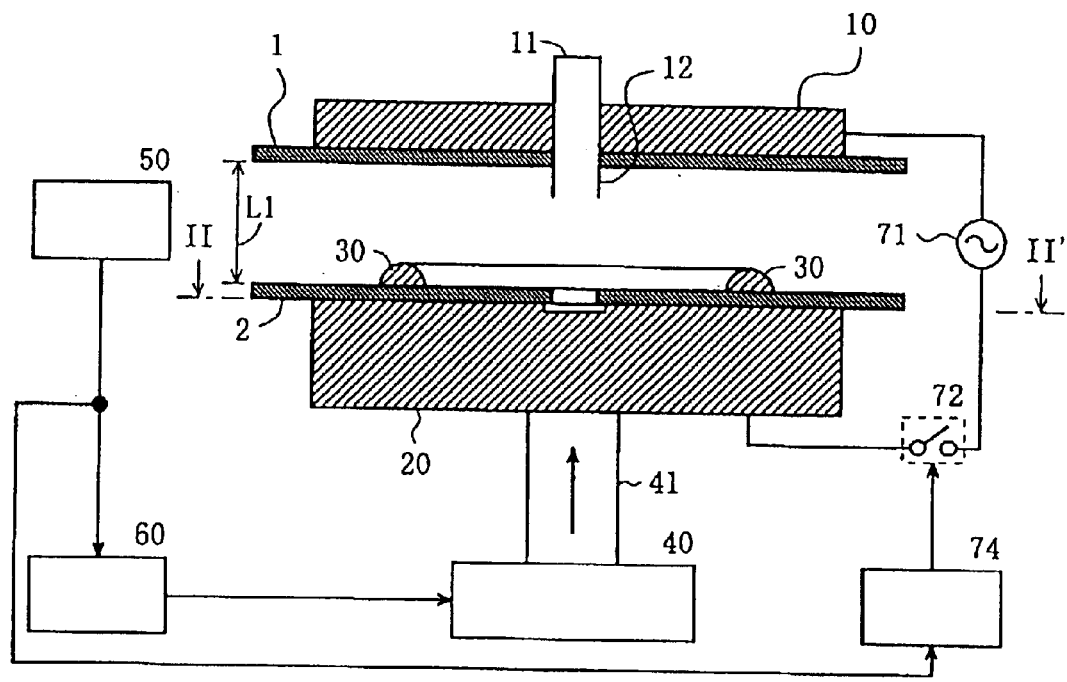
FIG. 1 is a schematic drawing representing an adhering apparatus 10 for optical disc substrates in a first preferred embodiment according to the present invention.

FIG. 1 shows a drawing representing adhering apparatus 100 for optical disc substrates in a first preferred embodiment according to the present invention.

Adhering apparatus 100 for optical disc substrates, namely, adhering apparatus 100 for optical disc substrates which adheres first optical disc substrate 1 and second optical disc substrate 2 adhered together via adhesive 30 and cures adhesive 30 includes absorbing-and-holding means 10 for absorbing and holding first optical disc substrate 1, serving also as an electrode, absorbing-and-holding means 20 for absorbing and holding second optical disc substrate 2, serving also as another electrode, optical disc substrate moving means 40, distance detecting means 50, velocity controlling means 60, and alternating current voltage applying means 71. Absorbing-and-holding means 10 includes chuck means 11 and chuck pawl 12 and is made of a metallic material.

Chuck pawl 12 supports each inner wall between optical disc substrates 1 and 2 while performing a diameter expanding operation in a center hole between these optical disc substrates 1 and 2 when both of the optical disc substrates 1 and 2 are moved to another position with both of optical disc substrates 1 and 2 overlapped.

Absorbing-and-holding means 20 is made of a disc-shaped matter made of such a conductive material as stainless.

It is noted that, in FIG. 1, specific absorbing means such as a vacuum compressor is omitted in FIG. 1 in the absorbing-and-holding means 10 and 20.

Optical disc substrate moving means 40 is means for raising or lowering absorbing-and-adhering means 20 by driving a rise/lower shaft 41 to mutually approach to optical disc substrate 1 and optical disc substrate 2.

Distance detecting means 50 is means for detecting a distance between optical disc substrate 1 and optical disc substrate 2.

Velocity controlling section 60 is means for controlling the relative velocity of optical disc substrate 2 to optical disc substrate 1. In addition, velocity controlling means 60 is means for controlling optical disc substrate moving means 40 in such a manner that the above-described relative velocity at the time point immediately before adhesive 30 applied onto optical disc substrate 2 is brought in contact with optical disc substrate 1 is faster than the relative velocity at the time point immediately after adhesive 30 applied onto optical disc substrate 2 is brought in contact with optical disc substrate 1.

It is noted that, in this embodiment, distance detecting means 50 estimates the time point immediately before adhesive 30 applied onto optical disc substrate 2 is brought in contact with optical disc substrate 1 on the basis of the distance detected by distance detecting means 50.

Alternating current voltage applying means 70 is the means for applying an alternating current voltage between optical disc substrate 1 and optical disc substrate 2 immediately before adhesive 30 applied on optical disc substrate 2 is brought in contact with optical disc substrate 1 and includes an AC power supply 71, switch 72, and switch controlling means 74.

Switch controlling means 74 turns on switch 72 when distance detecting means 50 detects that adhesive 30 applied onto optical disc substrate 2 is brought in contact with optical disc substrate 1 and the alternating current voltage is applied between conductive absorbing-and-holding means 10 and 20 so that an alternating current electric field is formed over a space between optical disc substrate 1 and optical disc substrate 2.

Next, an operation of adhering apparatus 100 for optical disc substrates 1 and 2 will be described below.

Figure 2:
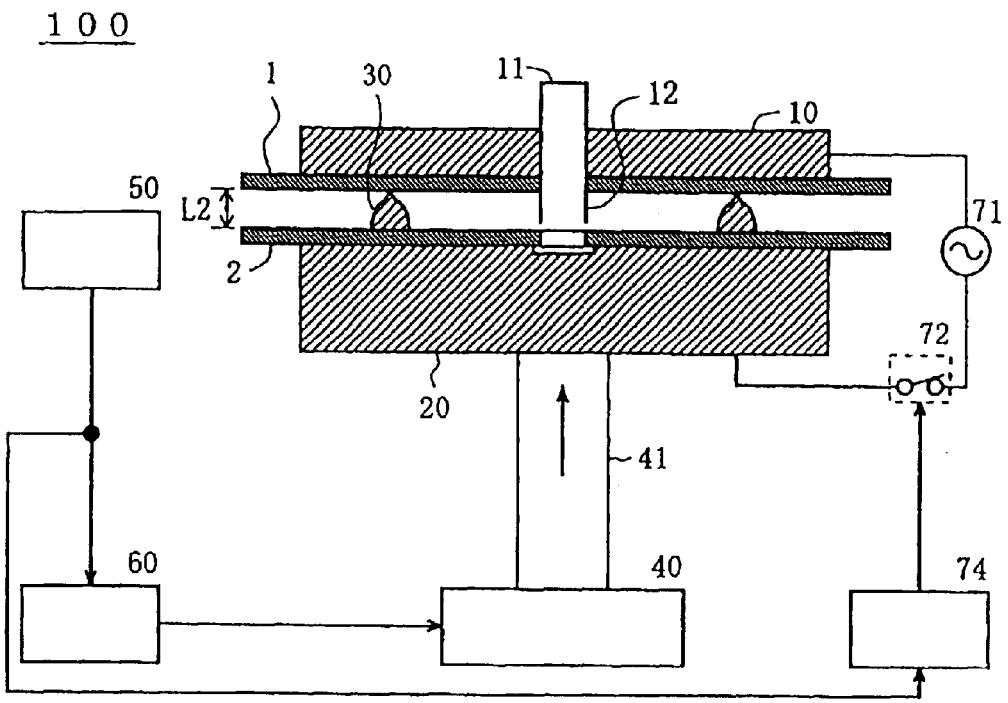
FIG. 2 is a schematic drawing of the first embodiment representing a state in which a distance between optical disc substrates 1 and 2 becomes L2 which is shorter than L1, a switch 72 is turned on, a voltage between optical disc substrates 1 and 2 is applied, this alternating current electric field causes adhesive 30 to be tapered.

FIG. 2 shows a state in the above-described embodiment in which the distance between optical disc substrates 1 and 2 becomes L2 shorter than L1, switch 72 is turned on, and an alternating current voltage between optical disc substrates 1 and 2 is applied, this alternating current voltage causing adhesive 30 to be tapered.

Figure 3:
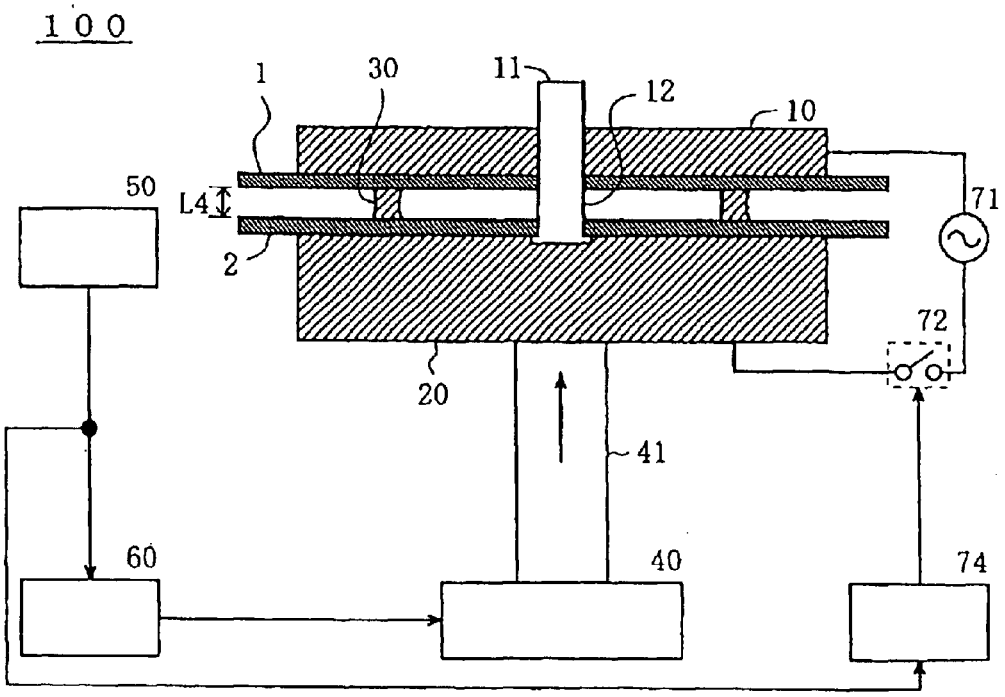
FIG. 3 is a schematic drawing of the first embodiment representing a state in which the distance between optical disc substrates 1 and 2 become L4 which is shorter than L2, optical disc substrates 1 and 2 are approached to each other at a shortest distance, adhesive 30 is completely adhered to optical disc 2, switch 72 is turned off, and the application of the voltage is ended at a space between optical disc substrates 1 and 2.

FIG. 3 shows a state in the above-described embodiment in which the distance between optical disc substrates 1 and 2 becomes L4 shorter than L2, both of optical disc substrates 1 and 2 approach to each other at a shortest distance, adhesive 30 completely adheres to optical disc 1, switch 72 is turned off, and the application of the alternating current voltage between optical disc substrates 1 and 2 is ended.

Figure 4:
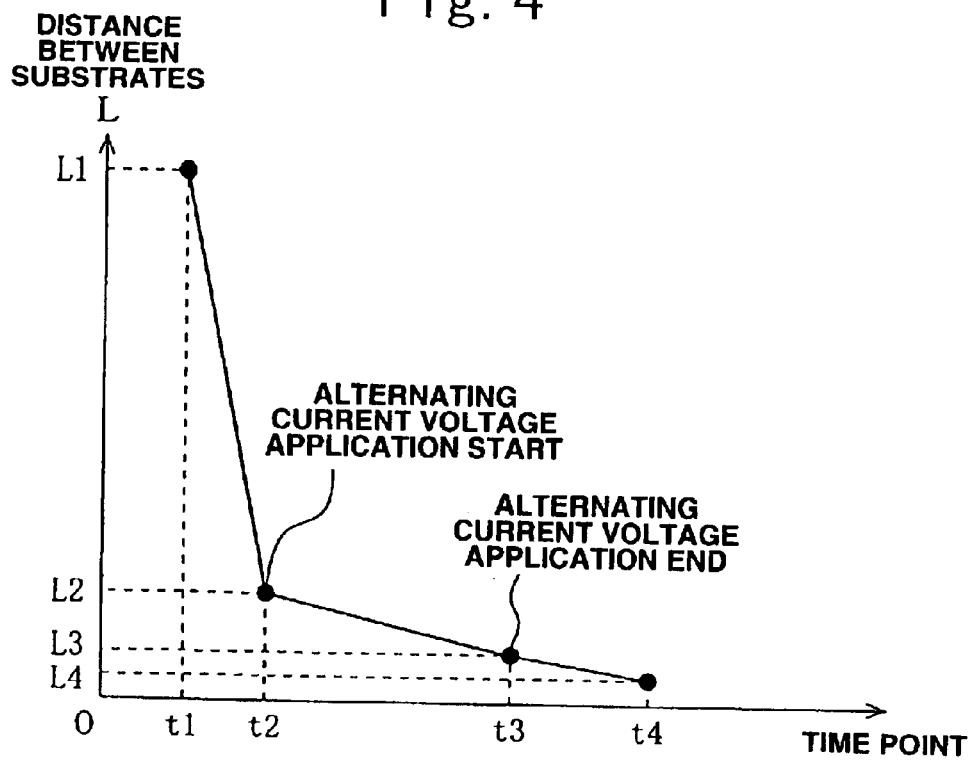
FIG. 4 is a graph representing a pattern in which the distance between optical disc substrates 1 and 2 is varied together with an elapse of time in the above-described embodiment.

FIG. 4 shows a graph representing a variation of the distance between optical disc substrates 1 and 2 along with an elapse of the time in the above-described embodiment.

Figure 5:
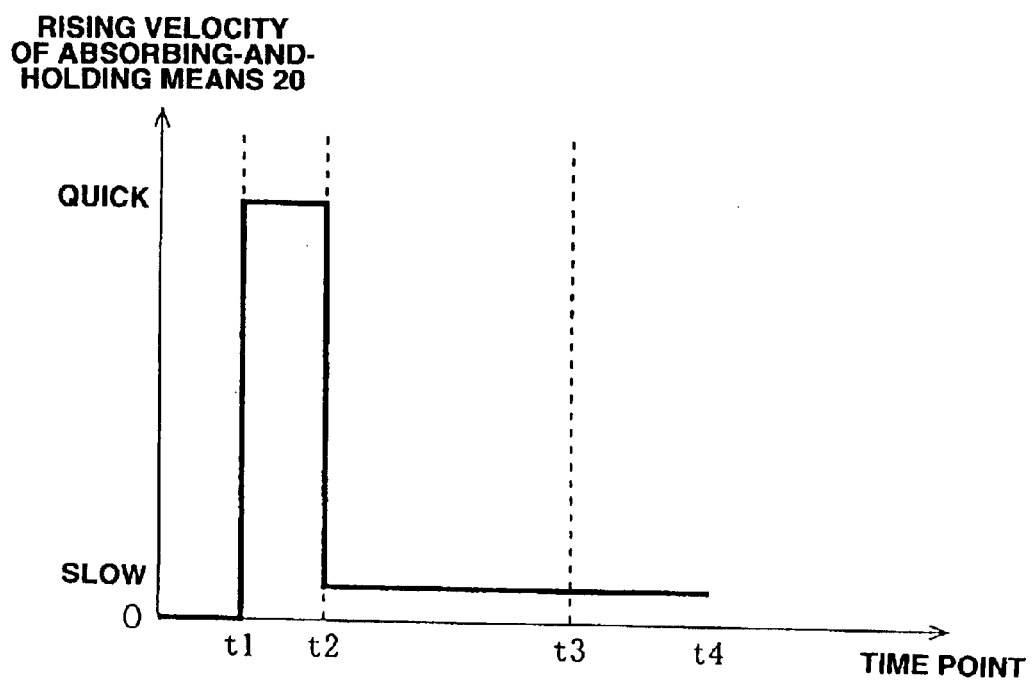
FIG. 5 is a graph representing a pattern in which a rising velocity of absorbing-and-holding means 20 is varied as the time is elapsed.

FIG. 5 shows a graph representing a variation pattern of a rising velocity of absorbing-and-holding means 20 along with an elapse of the time in the above-described embodiment.

First, at a time point of t1 shown in FIG. 4, the distance between substrates is L1, switch 72 is turned off, and no alternating current voltage is applied between optical disc substrates 1 and 2. From this state, absorbing-and-holding means 20 is raised at a relatively fast, as shown in FIG. 5. The distance between optical disc substrates 1 and 2 is shortened at a relatively quick speed.

Thereafter, at a time point of t2, the inter-substrate distance indicates L2 and distance detecting means 50 detects inter-substrate distance indicating L2. Upon receipt of inter-substrate distance information from distance detecting means 50, switch control means 74 turns switch 72 on and the alternating current voltage is applied between optical disc substrates 1 and 2. Then, as shown in FIG. 2, adhesive 30 is tapered and velocity controlling means 60 controls optical disc substrate moving means 40 in such a manner that the rising velocity of the absorbing-and-holding means 20 is relatively slowed as shown in FIG. 5.

Then, at a time point of t3, the distance between optical disc substrates 1 and 2 becomes L3 which is shorter than L2 and distance detecting means 50 detects that the distance between substrates 1 and 2 is L3. When distance detecting means 50 detects the above-described distance L3, switch controlling section 74 turns off switch 72 and the application of the alternating current voltage is ended.

As described above, at time point of t2, the alternating current voltage is applied, the adhesive 30 is tapered, and the distance between substrates is slowly shortened. Hence, no air bubble occurs in adhesive. In addition, since it is not necessary to increase the power supply voltage developed by alternating current power supply 71 to some degree, no discharge between two sheets of optical disc substrates 1 and 2 occurs.

After time point of t3, the distance between substrates 1 and 2 is slowly shortened. At a time point of t4, the distance between substrates indicates L4 such that optical disc substrates 1 and 2 are mutually approached to each other at the shortest distance. At this time, as shown in FIG. 3, adhesive 30 is completely adhered to optical disc substrate 1. Distance detecting means 50 detects that the distance between substrates indicates L4. When distance detecting means 50 detects that the distance indicates L4, velocity controlling means 60 stops the rise of absorbing-and-holding means 20 at time point of t4 or later. Next, absorbing-and-holding means 20 is lowered. This lowering velocity is relatively fast so that, at an end stage of one cycle, the absorbing-and-holding means 20 returns to a position shown in FIG. 1. At this time, optical disc substrate 2 is finally adhered onto optical disc substrate 1 by means of adhesive 30 in a state shown in FIG. 3.

As described above, in the above-described embodiment, since absorbing-and-holding means 20 is raised at a relatively fast speed for a time duration of time point t1 to time point t2 and lowers absorbing-and-holding means 20 relatively quickly, a whole time duration for which two sheets of optical disc substrates 1 and 2 are adhered can be shortened. In addition, as shown in FIG. 4, a time during which the alternating current voltage is applied becomes relatively short and the adhesive 30 is not deteriorated.

In addition, in the above-described embodiment, the distance between optical disc substrate 1 and optical disc substrate 2 at the time point (time point t2) immediately before adhesive 30 applied onto optical disc substrate 2 is brought in contact with optical disc substrate 1 is set to be equal to or shorter than 5 millimeters and, preferably, equal to or shorter than 2 millimeters.

In addition, as a contact area when a liquid film of adhesive 30 formed on one optical disc substrate 2 is, at first, brought in contact with the other disc substrate 1 becomes small, minute air bubbles are not easy to be developed. It is noted that a voltage value developed at alternating current power supply 71 is set to a value equal to or lower than a voltage below which no discharge between optical disc substrates 1 and 2 occurs.

Figure 6:
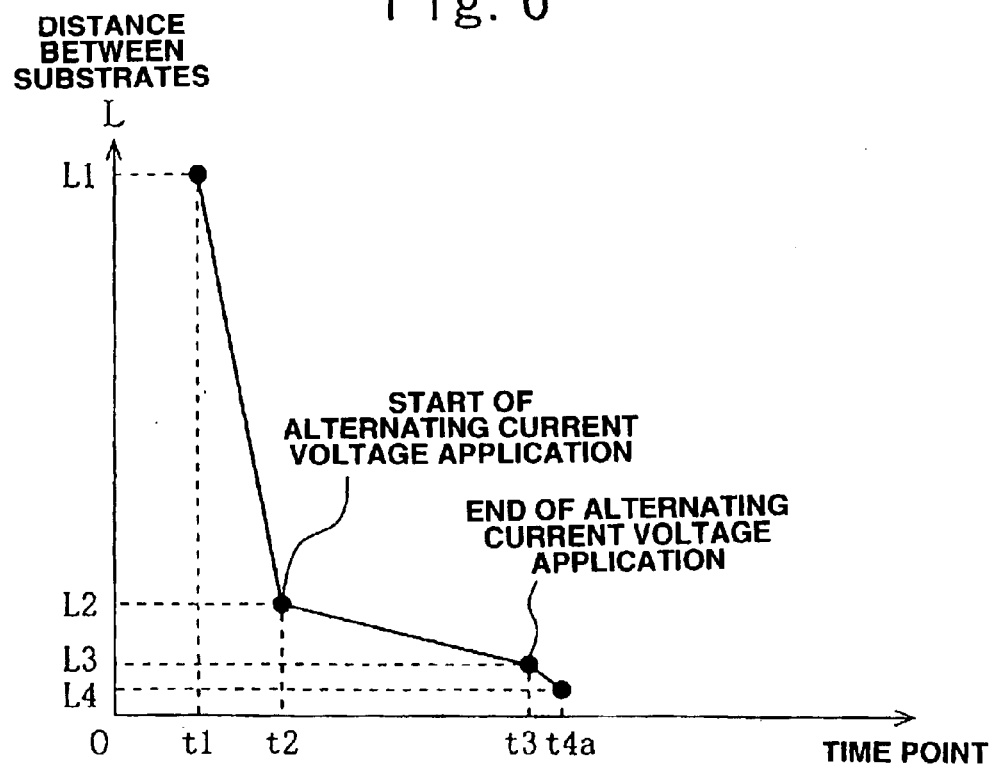
FIG. 6 is a graph representing a variation in the distance between optical disc substrates 1 and 2 as the time is elapsed in a modification of the above-described embodiment.

FIG. 6 shows a graph for explaining the operation of a modification of the above-described embodiment, viz., representing a variation pattern of the distance between optical disc substrates 1 and 2 together with the elapse of time.

Figure 7:
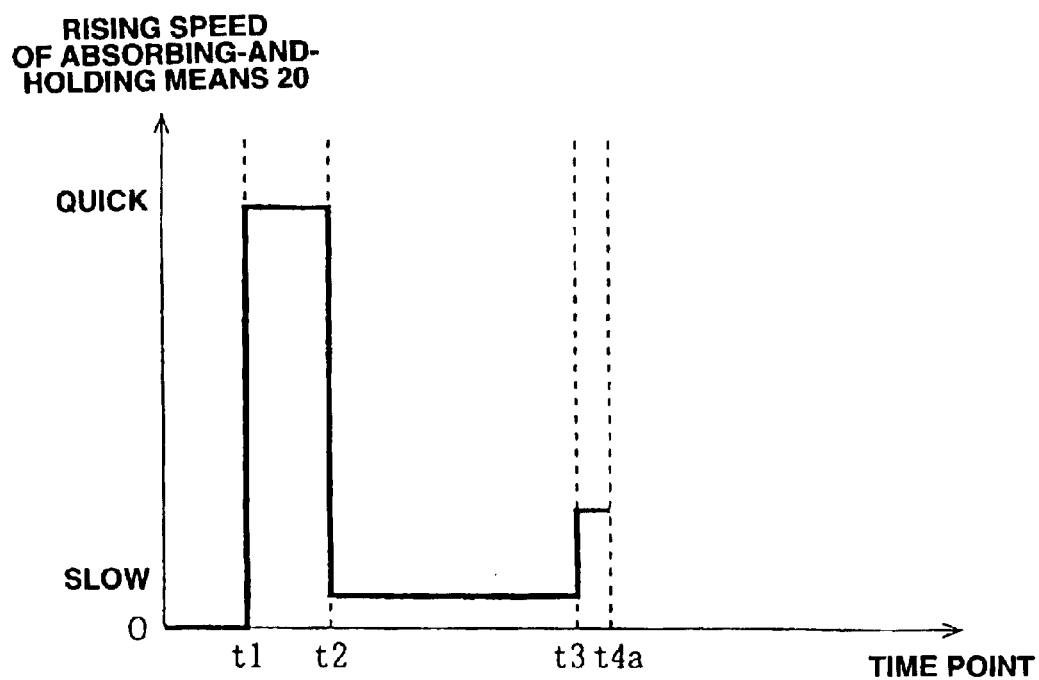
FIG. 7 is a graph representing a variation in a rising velocity of absorbing-and-holding means 20 as the time is elapsed in the modification of the above-described embodiment.

FIG. 7 shows a graph representing the variation pattern of the rising velocity of absorbing-and-holding means 20 along with an elapsed time in the modification of the above-described embodiment.

In the modification shown in FIGS. 6 and 7, the rising velocity of absorbing-and-holding means 20 is quickened after time point of t3 in the above-described embodiment and the distance between optical disc substrates 1 and 2 is shortest at time point t4a.

In this modification, the same advantages as those in the above-described embodiment shown in FIGS. 4 and 5 can be obtained. It is noted that, in this modification, if the velocity after time point t4a is made equal to that in the embodiment shown in FIGS. 4 and 5, the whole adhering time duration can be shortened than that in the case of the embodiment shown in FIGS. 4 and 5.

It is noted that, in the above-described embodiment, elapsed time detecting means may be installed for detecting the elapsed time from a predetermined timing in place of distance detecting means 50. The elapsed time detecting means estimates that it is a time point (time point t2) immediately before adhesive 30 applied on optical disc substrate 2 is brought in contact with optical disc substrate 1. In this case, the relative velocity at a time point (time point t2) immediately before adhesive 30 applied onto optical disc substrate 2 is brought in contact with optical disc substrate 1 is equal to or higher than 25 millimeters/second and, preferably, equal to or higher than 50 millimeters/second. In addition, in the above-described case, the relative velocity at a time point (time point t2) immediately after adhesive 30 applied onto optical disc substrate 2 is brought in contact with optical disc substrate 1 is equal to or lower than 10 millimeters/second and, preferably, equal to or lower than 5 millimeter/second.

Furthermore, in the above-described embodiment, adhesive 30 is applied only onto optical disc substrate 2 and optical disc substrates 1 and 2 are mutually approached to each other. However, in place of this operation, optical disc substrates 1 and 2 may be approached to each other with adhesive 30 applied onto both of optical disc substrate 1 and optical disc substrate 2.

That is to say, in this case, an adhering apparatus for optical disc substrates which adheres first optical disc substrate 1 and second optical disc substrate 2 together via adhesive 30 and cures adhesive 30 includes: optical disc substrate moving means 40 for moving first optical disc substrate 1 and second optical disc substrate plate 2 to approach to each other with the adhesive applied onto the first optical disc substrate and onto the second optical disc substrate while first optical disc substrate 1 is faced against second optical disc substrate 2; velocity controlling means 60 for controlling a relative velocity of second optical disc substrate 2 to first optical disc substrate 1 and controlling the optical disc substrate moving means in such a manner that the relative velocity immediately after and at a time point at which adhesive 30 applied onto the first optical disc substrate 1 is brought in contact with adhesive 30 applied onto second optical disc substrate 2 is slower than that immediately before adhesive 30 applied onto first optical disc substrate 1 is brought in contact with adhesive 30 applied onto second optical disc substrate 2; and alternating current voltage applying means 70 for applying an alternating current voltage between first optical disc substrate 1 and second optical disc substrate 2 immediately before adhesive 30 applied onto the first optical disc substrate 1 is brought in contact with adhesive 30 applied onto the second optical disc substrate 2.

In the above-described case, in a process in which the liquid film of adhesive 30 of optical disc substrate 1 is brought in contact with the liquid film of adhesive 30 of optical disc substrate 2, as a space between optical disc substrates 1 and 2 becomes narrower, the electric field between optical disc substrates 1 and 2 is augmented. When both liquid films are brought in contact with each other, an attracting force due to the electric field causes a summit portion of the one liquid film and a tip portion of other liquid film are tapered. These tapered summit portions of the liquid films are, at first, always brought in contact with each other. Hence, an area at an instant time when the above-described two liquid films are brought in contact with each other is estimated to be largely small as compared with the conventional art. It is noted that, even if the adhesive is applied only to the above-described upper optical disc substrate 1, the realization can be achieved. The same advantages as described in the embodiment can be obtained.

In each of the above-described embodiments, the adhering apparatus according to the present invention is applied to the optical disc substrates. However, the present invention is applicable to the plate shaped matter other than the optical disc substrates such as glass plate or lens or applicable to the manufacture of an optical disc in which the plate like matter such as a thin transparent film is used as a light transmission layer.

According to the present invention, in a case where two sheets of plate shaped matters are mutually approached to each other without development of air bubbles on the adhesive after the adhesive is applied over the whole periphery of the plate shaped matters, the whole time duration to adhere two sheets of optical disc substrates can be shortened. In addition, no discharge can occur between the two sheets of optical disc substrates and no deterioration in the adhesive can occur. It is noted that, although, in each embodiment, the alternating current voltage is applied between optical disc substrates 1 and 2, the same advantage may be obtained when a direct current voltage may be applied therebetween.

What is claimed is:

1. A plate shaped matter adhering apparatus which adheres a first plate shaped matter and a second plate shaped matter together via an adhesive and cures the adhesive, the plate shaped matter adhering apparatus comprising:

plate shaped matter moving means for moving the first plate shaped matter and the second plate shaped matter to approach to each other with the adhesive applied onto the second plate shaped matter while the first plate shaped matter is faced against the second plate shaped matter;

velocity controlling means for controlling a relative velocity of one of the first and second plate shaped matters to the other of the first and second plate shaped matters and controlling the plate shaped matter moving means in such a manner that the relative velocity immediately after and at a time point at which the adhesive applied onto the second plate shaped matter is brought in contact with the first plate shaped matter is slower than that immediately before the adhesive applied onto the second plate shaped matter is brought in contact with the first plate shaped matter; and voltage applying means for applying voltage between the first plate shaped matter and the second plate shaped matter before the adhesive applied onto the second plate shaped matter is brought in contact with the first plate shaped matter.

2. A plate shaped matter adhering apparatus as claimed in claim 1, wherein the plate shaped matter adhering apparatus further comprises distance detecting means for detecting a distance between the first plate shaped matter and the second plate shaped matter and estimates a time point immediately before the adhesive applied onto the second plate shaped matter is brought in contact with the first plate shaped matter on the basis of the distance detected by the distance measuring means.

3. A plate shaped matter adhering apparatus as claimed in claim 2, wherein the distance between the first plate shaped matter and the second plate shaped matter at the time point immediately before the adhesive applied onto the second plate shaped matter is brought in contact with the first plate shaped matter is equal to or shorter than 5 mm.

4. A plate shaped matter adhering apparatus as claimed in claim 1, wherein the plate shaped matter adhering apparatus further comprises time elapsed detecting means for detecting a time elapsed from a predetermined timing and estimates a time point immediately before the adhesive applied onto the second plate shaped matter is brought in contact with the first plate shaped matter on the basis of the time detected by the time elapsed detecting means.

5. A plate shaped matter adhering apparatus as claimed in claim 1, wherein the relative velocity at a time point immediately before the adhesive applied onto the second plate shaped matter is brought in contact with the first plate shaped matter is equal to or higher than 25 millimeter/second.

6. A plate shaped matter adhering apparatus as claimed in claim 1, wherein the relative velocity at a time point immediately after the adhesive applied onto the second plate shaped matter is brought in contact with the first plate shaped matter is equal to or lower than 10 millimeter/second.

7. A plate shaped matter adhering apparatus as claimed in claim 1, wherein the voltage application means is turned off after the adhesive applied on the second plate shaped matter is brought in contact with the first shaped matter.

8. A plate shaped matter adhering apparatus which adheres a first plate shaped matter and a second plate shaped matter together via an adhesive and cures the adhesive, the plate shaped matter adhering apparatus comprising:

plate shaped matter moving means for moving the first plate shaped matter and the second plate shaped matter to approach to each other with the adhesive applied onto the first plate shaped matter and onto the second plate shaped matter while the first plate shaped matter is faced against the second plate shaped matter;

velocity controlling means for controlling a relative velocity of one of the first and second plate shaped matters to the other of the first and second plate shaped matters and controlling the plate shaped matter moving means in such a manner that the relative velocity immediately after and at a time point at which the adhesive applied onto the first plate shaped matter is brought in contact with the adhesive applied onto second plate shaped matter is slower than that immediately before the adhesive applied onto the first plate shaped matter is brought in contact with the adhesive applied onto the second plate shaped matter; and voltage applying means for applying voltage between the first plate shaped matter and the second plate shaped matter before the adhesive applied onto the first plate shaped matter is brought in contact with the adhesive applied onto the second plate shaped matter.

9. A plate shaped matter adhering apparatus as claimed in claim 8, wherein the voltage application means is turned off after the adhesive is brought in contact with the other adhesive.

10. A plate shaped matter adhering method in which a first plate shaped matter and a second plate shaped matter are adhered together via an adhesive and the adhesive is cured, the plate shaped matter adhering method comprising:

plate shaped matter moving step for moving the first plate shaped matter and the second plate shaped matter to approach to each other with the adhesive applied onto the second plate shaped matter while the first plate shaped matter is faced against the second plate shaped matter;

velocity controlling step for controlling a relative velocity of one of the first and second plate shaped matters to the other of the first and second plate shaped matters in such a manner that the relative velocity immediately after and at a time point at which the adhesive applied onto the second plate shaped matter is brought in contact with the first plate shaped matter is slower than that immediately before the adhesive applied onto the second plate shaped matter is brought in contact with the first plate shaped matter; and voltage applying step for applying voltage between the first plate shaped matter and the second plate shaped matter before the adhesive applied onto the second plate shaped matter is brought in contact with the first plate shaped matter.

11. A plate shaped matter adhering method as claimed in claim 10, wherein, when the one adhesive is brought in contact with the adhesive applied onto the other plate shaped matter or the other plate shaped matter, the application of the voltage is stopped.

12. A plate shaped matter adhering method in which a first plate shaped matter and a second plate shaped matter are adhered together via an adhesive and the adhesive is cured, the plate shaped matter adhering method comprising:

plate shaped matter moving step for moving the first plate shaped matter and the second plate shaped matter to approach to each other with the adhesive applied onto the first plate shaped matter and onto the second plate shaped matter while the first plate shaped matter is faced against the second plate shaped matter;

velocity controlling step for controlling a relative velocity of one of the first and second plate shaped matters to the other of the first and second plate shaped matters and controlling the plate shaped matter moving means in such a manner that the relative velocity immediately after and at a time point at which the adhesive applied onto the first plate shaped matter is brought in contact with the adhesive applied onto the second plate shaped matter is slower than that immediately before the adhesive applied onto the first plate shaped matter is brought in contact with the adhesive applied onto the second plate shaped matter; and voltage applying step for applying voltage between the first plate shaped matter and the second plate shaped matter before the adhesive applied onto the first plate shaped matter is brought in contact with the adhesive applied onto the second plate shaped matter.

13. A plate shaped matter adhering method as claimed in claim 12, wherein, when the one adhesive is brought in contact with the adhesive applied onto the other plate shaped matter or the other plate shaped matter, the application of the voltage is stopped.

* * * * *